United States Patent [19]
Fujitani et al.

[11] Patent Number: 5,304,345
[45] Date of Patent: Apr. 19, 1994

[54] HYDROGEN ABSORBING ALLOY

[75] Inventors: Shin Fujitani; Ikuo Yonezu, both of Hirakata; Koichi Nishimura, Suita; Toshihiko Saito, Kyoto; Akio Furukawa, Osaka, all of Japan

[73] Assignee: Sanyo Electric Co., Ltd., Osaka, Japan

[21] Appl. No.: 963,030

[22] Filed: Oct. 19, 1992

Related U.S. Application Data

[63] Continuation of Ser. No. 708,599, May 30, 1991, abandoned.

[30] Foreign Application Priority Data

May 31, 1990 [JP] Japan ................ 2-142300

[51] Int. Cl.$^5$ ............................................. C22C 19/03
[52] U.S. Cl. ........................... 420/455; 420/900; 429/218
[58] Field of Search ............... 420/455, 900; 429/218; 423/644

[56] References Cited

U.S. PATENT DOCUMENTS

| | | | |
|---|---|---|---|
| 4,378,331 | 3/1983 | Bruning et al. | 420/900 |
| 4,668,310 | 5/1987 | Kudo et al. | 420/581 |
| 4,925,748 | 5/1990 | Ikoma et al. | 429/59 |

FOREIGN PATENT DOCUMENTS 0251384 7/1988 European Pat. Off. .
60-121398 6/1985 Japan .................. 420/455

OTHER PUBLICATIONS

H. H. Van Mal; K. H. Buschau and A. R. Miedema, "Hydrogen Absorption in LaNi$_5$ and Related Compounds; Experimental Observations and Their Explanation", *Journal of Less Common Metals* 35 (1974) pp. 65–76.

*Primary Examiner*—R. Dean
*Assistant Examiner*—Margery S. Phipps
*Attorney, Agent, or Firm*—Armstrong, Westerman, Hattori, McLeland & Naughton

[57] ABSTRACT

A hydrogen absorbing alloy having a crystal structure of CaCu$_5$-type hexagonal system and represented by the general formula Re$_{1-x}$Y$_x$(Ni$_{5-y}$G$_y$)$_z$ wherein Re is one of La, Ce, Nd, Pr, misch metal and lanthanum-rich misch metal, Y is yttrium, Ni is nickel, and G is an element capable of forming an intermetallic compound or complete solid solution in corporation with Ni or a mixture of such elements, and x, y and z are in the ranges of $0 < x \leq 0.6$, $0 < y \leq 1$ and $0.8 < z \leq 1.2$, respectively. This alloy has a high equilibrium hydrogen desorbing pressure at room temperature, a great capacity to absorb hydrogen and high durability to repeatedly absorb and desorb hydrogen.

2 Claims, 2 Drawing Sheets

HYDROGEN ABSORBING ALLOY

This application is a continuation of application Ser. No. 07/708,599 filed May 30, 1991, abandoned.

BACKGROUND OF THE INVENTION

The present invention relates to improvements in rare-earth element type hydrogen absorbing alloys.

Hydrogen absorbing alloys are adapted to absorb hydrogen for storage and to desorb the hydrogen for use to utilize the desorbing pressure and the heat of endothermic reaction during the desorption as an energy source. The hydrogen desorbing pressure and the heat of endothermic reaction are utilized as drive sources for hydrogen compressors, actuators, cold generating heat pumps, etc. For this purpose, these alloys must be high in equilibrium hydrogen desorbing pressure around room temperature and great in capacity to absorb hydrogen and have outstanding durability to repeatedly absorb and desorb hydrogen.

The rare-earth element type hydrogen absorbing alloys already known for use include, for example, those disclosed in Unexamined Japanese Patent Publication SHO 60-197835 and represented by the general formula $(Nd_xR_y)Ni_5$ wherein R is a rare-earth element other than neodymium or an alloy of the rare-earth elements, $0.4 < x < 1.0$ and $0.0 < y < 0.6$. These alloys are rare-earth element-$Ni_5$ alloys having a specified amount of Nd incorporated therein so as to be given an increased capacity to absorb hydrogen and an elevated equilibrium hydrogen desorbing pressure around room temperature, whereas they have the drawback of being low in durability to repeatedly absorb and desorb hydrogen.

Unexamined Japanese Patent Publication SHO 60-70154 discloses other known examples of rare-earth metal-$Ni_5$ alloys which are represented by the general formula $LmNi_{a-x}A_x$ wherein Lm is one of rare-earth metals including 40 to 70% La, 0.1 to 2.0% Ce, Nd, Pr and Sm, A is a metal selected from the group consisting of Al, Mn, Fe and Cr, $4.8 < a < 5.5$ and x is 0.01 to 2.0. These alloys are rare-earth metal-Ni alloys having Al, Mn or like metal incorporated therein and thereby are given improved flatness of plateau (stability of hydrogen dissociation equilibrium) and an increased capacity to absorb hydrogen at a relatively low equilibrium pressure (up to about 5 atm. around room temperature). However, these alloys are not suited for use as the energy sources mentioned above since they are not high in equilibrium hydrogen desorbing pressure around room temperature.

Although various other improvements in rare-earth element-$Ni_5$ alloys have been proposed, hydrogen absorbing alloys have yet to be developed which possess all the three characteristics of a high equilibrium hydrogen desorbing pressure around room temperature, a great capacity to absorb hydrogen and high durability to repeatedly absorb and desorb hydrogen.

An object of the present invention is to provide a hydrogen absorbing alloy which has the three characteristics of a high equilibrium hydrogen desorbing pressure in the vicinity of room temperature, a great hydrogen absorbing capacity and high durability to repeatedly absorb and release hydrogen, and which is suitable as a drive source, for example, for refrigeration systems of the thermal drive type.

SUMMARY OF THE INVENTION

The present invention provides a hydrogen absorbing alloy having a crystal structure of hexagonal system of the $CaCu_5$ type and represented by the general formula: $Re_{1-x}Y_x(Ni_{5-y}G_y)_z$ wherein Re is one of La, Ce, Nd, Pr, misch metal and lanthanum-rich misch metal (misch metal comprising at least 80 wt. % of La and up to 5 wt. % of Ce), Y is yttrium, Ni is nickel, G is an element capable of forming an intermetallic compound or complete solid solution incorporation with Ni or a mixture of such elements, and x, y and z are in the ranges of $0 < x \leq 0.6$, $0 < y \leq 1$ and $0.8 < z \leq 1.2$, respectively.

The crystal structure of hexagonal system of the $CaCu_5$ type is generally known in the art and defined, for example, in W. B. Pearson, "A HANDBOOK OF LATTICE SPACINGS AND STRUCTURES OF METALS AND ALLOYS," Vol. 2, Pergamon Press Ltd. This crystal structure has the feature of being capable of absorbing and desorbing a large quantity of hydrogen.

While Re is selected from among La, Ce, Nd, Pr, misch metal and lanthanum-rich misch metal, lanthanum-rich misch metal is most desirable from the viewpoint, for example, of economy and assuring the alloy of satisfactory equilibrium characteristics.

The element capable of forming an intermetallic compound or complete solid solution incorporation with Ni or a mixture of such elements can be, for example, at least one element selected from the group consisting of Al, B, Sn, V, Cr, Mn, Fe, Co and Cu. With the alloy of the present invention, Ni is partially replaced by such an element or a mixture of some of these elements to thereby prevent deterioration of the alloy due to the liberation of Ni in the form of a single element occurring during repetitions of absorption and release of hydrogen and give improved durability to the alloy.

On the other hand, the replacement of part of Ni leads to the drawback of reduced equilibrium hydrogen desorbing pressure and a decreased hydrogen absorbing capacity. With reference to the general formula, Re is therefore partially replaced by Y to ensure an elevated equilibrium hydrogen desorbing pressure and to maintain the desired hydrogen absorbing capacity.

Among the above elements for partially replacing Ni, it is desirable to use Al, Cr, Mn or Co from the viewpoint of avoiding a great reduction in the hydrogen absorbing capacity and an increase in the slope of the plateau region.

An increase in the amount of Y substituting for Re decreases the hydrogen absorbing capacity and increases the slope of the plateau region, so that a reduced efficiency will result when the alloy is used for application systems. Accordingly, x is limited to the range of $0 < x \leq 0.6$.

Further if the amount y of Al or other element substituting for Ni exceeds 1, the equilibrium hydrogen desorbing pressure decreases markedly, rendering the alloy unsuitable for use as the energy source, while a reduced hydrogen absorbing capacity also results. Accordingly, y is limited to the range of $0 < y \leq 1$.

Further the stoichiometric ratio z should be in the range of $0.8 < z \leq 1.2$ in order to ensure a capacity to absorb about 1 wt. % of hydrogen and to avoid an increase in the gradient of the plateau region.

EXAMPLE

Figure 1:
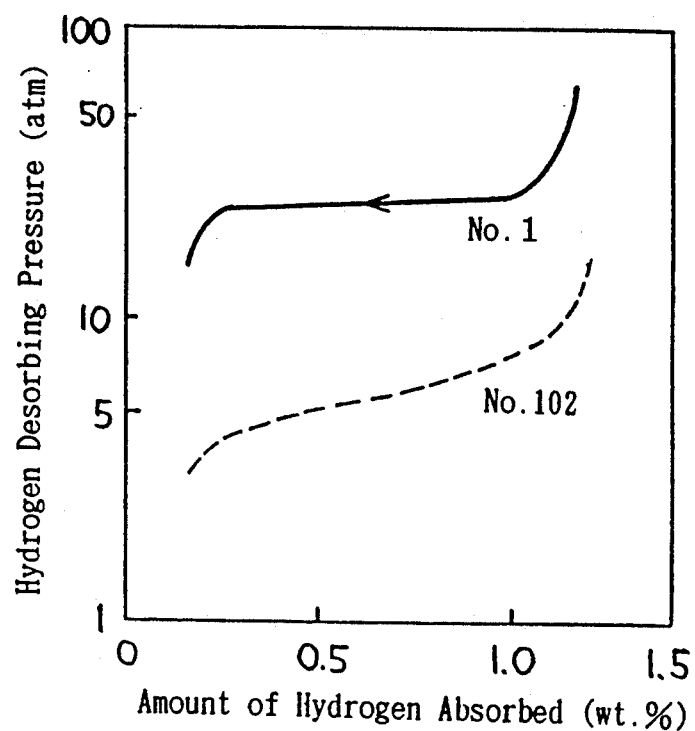
FIG. 1 is a graph showing the relationship between the hydrogen release pressure and the amount of hydrogen absorbed.

Specimens were prepared from particulate mixtures of various compositions by compressing each mixture, then melting the mixture in an argon-arc melting furnace and casting the molten mixture into button-shaped alloy ingots. When checked by X-ray diffractometry, the specimens were all found to be of hexagonal crystal structure of the $CaCu_5$ type.

Table 1 shows the alloy composition (as expressed in atomic %) of each specimen. Specimens No. 1 to No. 11 are alloys of the invention, and specimens No. 101 to No. 108 are those of the prior art. In the table, "Mn" stands for misch metal, and "LRM" for lanthanum-rich misch metal and comprising at least 80 weight % of La and up to 5 weight % of Ce.

Next, the specimens prepared by the above procedure were pulverized to about 100 mesh, subjected to an activation treatment and thereafter tested for hydrogenation equilibrium characteristics and hydrogen absorption-desorption cycle characteristics.

For the activation treatment, the specimens were evacuated to a vacuum at 80° C. and subjected to an increased hydrogen pressure of 30 atm. at room temperature to cause the alloy to start absorbing hydrogen.

The hydrogenation equilibrium characteristics test was conducted by measuring pressure-composition (hydrogen content) isothermal lines diagram using a Sievelt device. Table 1 shows the test results.

For the hydrogen absorption-desorption cycle characteristics test, the specimens were subjected to a hydrogen pressure of 10 to 30 atm. and evacuated to a vacuum at 25° C. repeatedly 100 times and thereafter checked for the absorption of hydrogen. The test result is expressed in terms of the ratio of the amount (V) of hydrogen absorbed after the 100 cycles to the amount (Vo) of hydrogen absorbed immediately after the initial activation. Table 1 also shows the test results.

The test results indicate that the alloys of the invention have an equilibrium hydrogen desorbing pressure of at least about 8 atm. and after the 100 cycles, absorb at least about 85% of the amount of hydrogen initially absorbed.

TABLE 1

| Specimen No. | Alloy | Equilibrium Pressure of Hydrogen Release at 25° C. (atm) | Ratio of Hydrogen Absorbed Amount after 100 cycles (V/Vo) |
|---|---|---|---|
| 1 | $La_{0.5}Y_{0.5}Ni_{4.8}Al_{0.2}$ | 30.0 | 0.95 |
| 2 | $LRM_{0.7}Y_{0.3}Ni_{4.8}Al_{0.2}$ | 26.7 | 0.89 |
| 3 | $Mm_{0.9}Y_{0.1}Ni_{4.8}Al_{0.2}$ | 14.1 | 0.87 |
| 4 | $La_{0.7}Y_{0.3}Ni_{4.8}B_{0.2}$ | 8.2 | 0.92 |
| 5 | $La_{0.7}Y_{0.3}Ni_{4.8}Sn_{0.2}$ | 8.8 | 0.85 |
| 6 | $La_{0.7}Y_{0.3}Ni_{4.8}V_{0.2}$ | 11.9 | 0.93 |
| 7 | $La_{0.7}Y_{0.3}Ni_{4.8}Cr_{0.2}$ | 9.1 | 0.88 |
| 8 | $La_{0.7}Y_{0.3}Ni_{4.8}Mn_{0.2}$ | 8.3 | 0.86 |
| 9 | $La_{0.7}Y_{0.3}Ni_{4.8}Fe_{0.2}$ | 9.5 | 0.85 |
| 10 | $La_{0.7}Y_{0.3}Ni_{4.8}Co_{0.2}$ | 15.3 | 0.94 |
| 11 | $La_{0.7}Y_{0.3}Ni_{4.8}Cu_{0.2}$ | 11.3 | 0.89 |
| 101 | $La_{0.5}Ce_{0.5}Ni_5$ | 27.3 | 0.73 |
| 102 | $La_{0.5}Nd_{0.5}Ni_5$ | 6.5 | 0.75 |
| 103 | $La_{0.5}Sm_{0.5}Ni_5$ | 6.9 | 0.69 |
| 104 | $La_{0.8}Y_{0.2}Ni_5$ | 6.6 | 0.70 |
| 105 | $LaNi_{4.7}Al_{0.3}$ | 0.8 | 0.88 |
| 106 | $LRMNi_{4.8}Fe_{0.2}$ | 3.8 | 0.85 |
| 107 | $LRMNi_{4.8}Cr_{0.2}$ | 1.5 | 0.91 |
| 108 | $LRMNi_{4.8}Mn_{0.2}$ | 1.1 | 0.86 |

Figure 2:
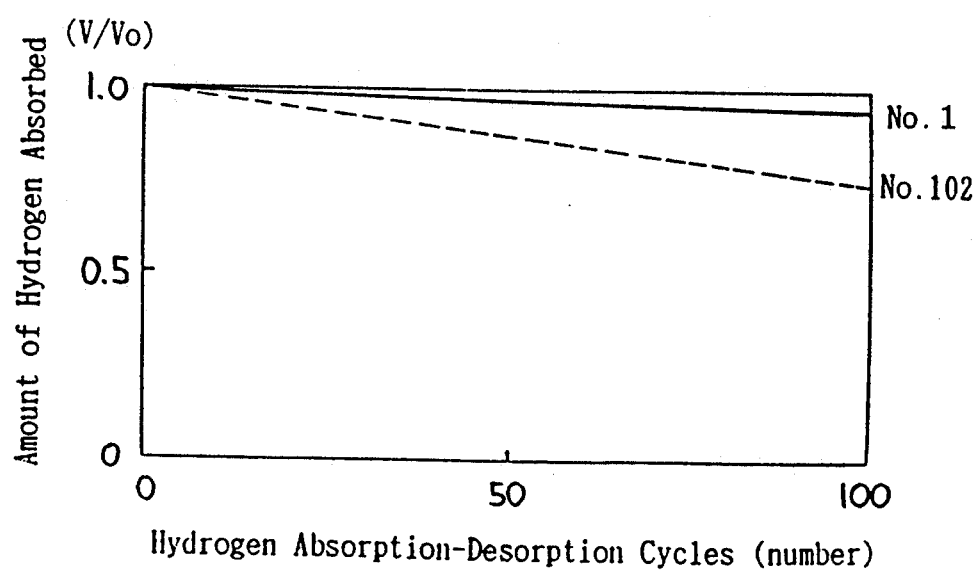
FIG. 2 is a graph showing the relationship between the amount of hydrogen absorbed and hydrogen absorption-desorption cycles.

Next, the alloys of specimens No. 1 and No. 102 were checked for the relationship between the hydrogen desorbing pressure and the amount of hydrogen absorbed, and for the relationship between the amount of hydrogen absorbed and hydrogen absorption-desorption cycles, with the results given in FIG. 1 and FIG. 2, respectively.

The result shown in FIG. 1 indicates that the alloy of the invention, No. 1, is not only higher in equilibrium hydrogen desorbing pressure but also more satisfactory in the flatness of plateau region than the conventional alloy No. 102. The result of FIG. 2 reveals that the alloy of the invention, No. 1, substantially retains the initial hydrogen absorption value even after the 100 hydrogen absorption-desorption cycles and is therefore excellent in durability.

Figure 3:
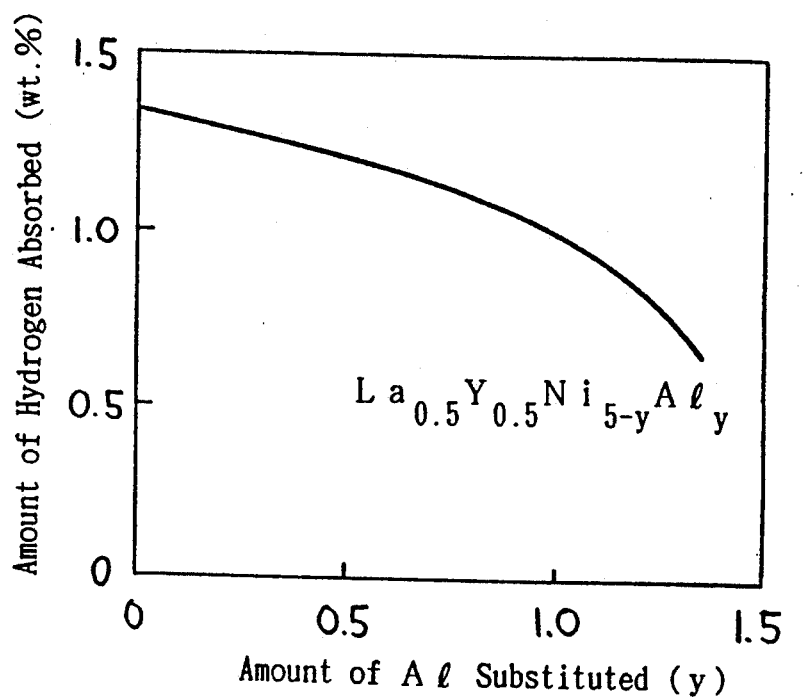
FIG. 3 is a graph showing the relationship between the amount of Al substituted and the amount of hydrogen absorbed.

Further alloys of the formula $La_{0.5}Y_{0.5}Ni_{5-y}Al_y$ with varying y values were checked for the relationship between the amount y of Al substituted and the amount of hydrogen absorbed. FIG. 3, showing the result, indicates that the value y must be up to 1 to give the alloy a capacity to absorb about 1 wt. % of hydrogen as desired for the foregoing practical use.

Figure 4:
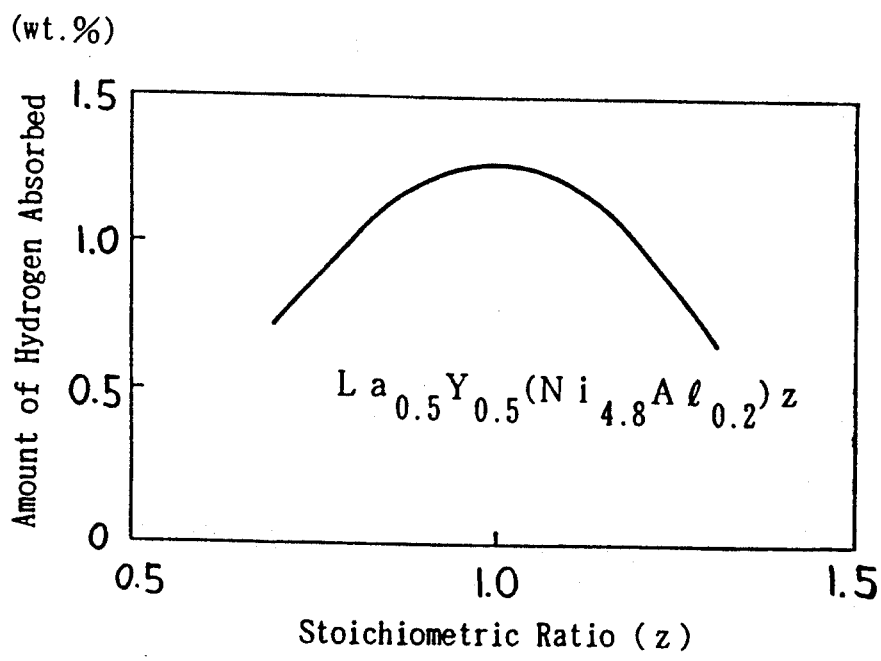
FIG. 4 is a graph showing the relationship between the amount of hydrogen absorbed and the stoichiometric ratio z.

Further alloys of the formula $La_{0.5}Y_{0.5}(Ni_{4.8}Al_{0.2})_z$ with varying z values were checked for the relationship between the amount of hydrogen absorbed and the stoichiometric ratio z, with the result shown in FIG. 4. FIG. 4 indicates that the ratio z should be in the range of 0.8 to not greater than 1.2 to assure the alloy of a capacity to absorb about 1 weight % of hydrogen as desired for the practical use mentioned above.

The hydrogen absorbing alloy of the present invention has a high equilibrium hydrogen release pressure around room temperature, a great capacity to absorb hydrogen and high durability to repeatedly absorb and desorb hydrogen. The alloy is therefore well-suited for use as drive sources for hydrogen compressors, actuators, cold generating heat pumps, etc. and contributes a great deal to the establishment of element techniques for hydrogen energy systems.

What is claimed is:

1. A hydrogen absorbing alloy having an hexagonal $CaCu_5$ crystal structure, said alloy consisting of $$LRM_{1-x}Y_x(Ni_{5-y}G_y)_z$$

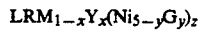

wherein LRM is lanthanum-rich misch metal comprising at least 80 weight % of La and up to 5 weight % of Ce, Y is yttrium, Ni is nickel, G is at least one element selected from the group consisting of Al, Cr, Mn and Co, and x, y and z are in the ranges of $0.05 \leq x \leq 0.6$, $0.05 \leq y \leq 1$ and $0.8 < z \leq 1.2$, respectively.

2. The hydrogen absorbing alloy as defined in claim 1 wherein x and y are in the ranges of $0.1 \leq x \leq 0.6$ and $0.2 \leq y \leq 1$, respectively.

* * * * *